May 31, 1927.  
J. SCHMIDT  
VALVE CONSTRUCTION  
Filed Dec. 18, 1925

1,630,973

INVENTOR.  
John Schmidt,  
BY  
ATTORNEY

Patented May 31, 1927.

1,630,973

UNITED STATES PATENT OFFICE.

JOHN SCHMIDT, OF CAMDEN, NEW JERSEY.

VALVE CONSTRUCTION.

Application filed December 18, 1925. Serial No. 76,163.

This invention relates generally to valves such as are used in pipe lines in acid or dye plants, the invention having more particular reference to a novel type of valve.

The invention has for an object the provision of an improved valve which will act more efficiently and which will not obstruct the flow of the liquid when wide open.

For further comprehension of the invention, and of the objects and advantages thereof, reference will be had to the following description and accompanying drawing, and to the appended claims in which the various novel features of the invention are more particularly set forth.

Fig. 1 of the drawing is a central vertical sectional view of my improved valve.

Figure 1:
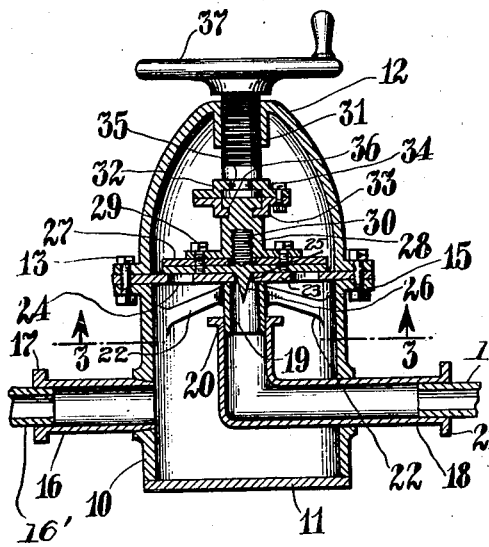
Figure 2:
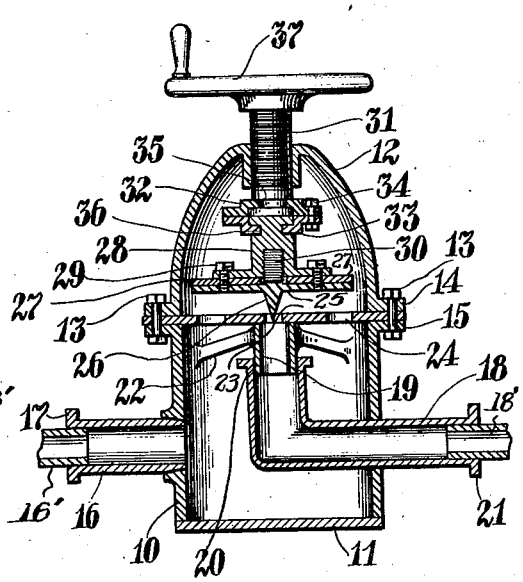
Fig. 2 is a similar view, but showing the valve proper in an open position.
Figure 3:
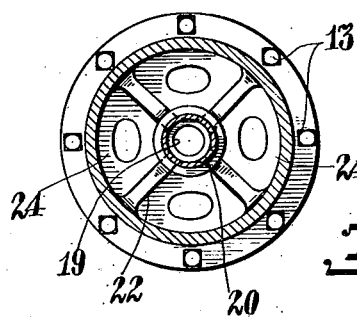
Fig. 3 is a horizontal sectional view taken on the line 3—3 of Figure 1.

As here embodied my improved valve comprises a valve body having a lower member 10, a bottom member 11 suitably attached thereto, and an upper member 12 attached to the lower member in any suitable manner such as by bolts 13 located in the flanges 14 and 15 of the upper member 12 and the lower member 10.

The lower member 10 has conveniently attached thereto an outlet 16 having a flange 17, or any similar suitable means of connecting to a pipe line, 16'. The inlet 18 is bent or otherwise formed at right angles, and has its inner extremity suitably attached to a pipe 19 positioned within said lower member, as at 20. The lower extremity of the inlet 18 extends outside the lower member 10, and has a flange 21, or any suitable means of connecting to a pipe line 18', tank or to whatever desired. The valve pipe 19 is of hollow cylindrical construction, centrally located within the lower member 10, and is supported therein by suitable ribs or supporting members 22.

The valve seat 23 has suitably located apertures to accommodate the bolts 13, and is attached between the flanges 14 and 15, as clearly shown in the accompanying drawings. The valve seat 23 is also provided with apertures 24, preferably oval shaped, each having its major axis coinciding with a chord of circular disc seat 23 for receiving liquid sprayed thereupon. The provision of oval apertures permits the valve seat 23 to have a much larger open area than would be afforded by circular openings and by positioning the main axis of the opening on a chord of the circular disc the latter is not weakened, and a much greater open area is attainable. A circular opening of limited diameter would have to be employed as an alternative to prevent excessive weakening of the disc seat 23. The valve proper 25 has a downward protruding portion 26, cone shaped, and located in a relatively central position within the valve passage 19, the valve proper 25 and the ring 27 being attached to the stem 28 by bolts 29, or any other suitable means. The valve proper 25, is also provided with a threaded portion 30, as a further means of assuring the attaching heretobefore mentioned. The operating rod 31 is attached to the stem 28 by means of clamps 32 and 33, having tongued portions 35 and 36 respectively to engage in suitably located grooves in the operating rod 31 and in the stem 28, said clamps 32 and 33 being secured to one another by bolts 34, or any other suitable means. The operating rod 31 is threadedly attached to the upper member 12, and has a hand wheel 37, or any similar suitable means by which the said operating rod may be rotated or turned, so as to raise or lower the said valve proper 25. The downward projecting portion 26 is disposed in the path of the inflowing liquid and its inclined sides are adapted to spray such liquid thereby distributing the same over the entire area of the valve seat 23 where it is free to flow through the plurality of openings 24. This spraying action is of marked advantage when the device is not properly positioned with the valve seat in a horizontal plane. With the valve seat inclined, the water is sprayed by the projection 26 and is directed thereby to the opening in the elevated portion of the seat as well as to the other openings. Without the spraying action the liquid would be discharged to only the lowermost openings of the inclined seat.

This spraying action may also be employed to effect proper mixing of a liquid comprising several substances and thus the projection may be employed as a baffle where a mixing operation is required.

Figure 4:
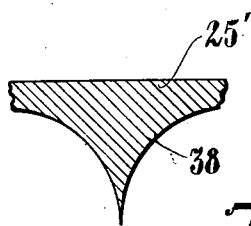
Fig. 4 is an enlarged fragmentary sectional view showing a modified valve proper such as may be used with my improved valve.

Referring in particular to Figure 4 of the accompanying drawing, in which I have illustrated a slight modification of my improved valve, the valve proper 25' is provided with a flared cone shaped portion 38, downward protruding therefrom.

It is obvious that I have provided a valve having a substantially full opening, and that by means of the cone shaped portion 26, or the flared cone shaped portion 38, the liquid entering through the inlet 18 will pass through the valve passage 19 when the valve proper is opened and will be distributed to all the apertures 24 to facilitate a rapid passage of liquid through the valve seat 23, and will then pass out through the outlet 16.

While I have above described the preferred form, construction and arrangement of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention, what I claim as new, and desire to protect by Letters Patent of the United States is as follows:—

1. A valve comprising upper and lower casings, an outlet pipe communicating with said lower casing, a valve seat interposed between said upper and lower casings having a plurality of spaced openings therein located between the periphery and center thereof and a center opening, a valve comprising a disc portion adapted to cover said spaced openings, a cone shaped projection depending from said disc member adapted to be disposed in said center opening, and operating means for simultaneously retracting said projection from said center opening and lifting said disc portion from the upper surface of said valve seat to permit liquid to flow upwardly through said center opening and through said spaced openings into said lower casing, said cone-shaped projection being adapted when in its retracted position to spray said upwardly flowing liquid for distributing the same to said spaced openings.

2. A valve comprising a valve body having a lower member, a bottom member attached thereto, and an upper member attached to the said lower member by flanges, the said lower member having attached thereto an outlet, an inlet attached to a valve passage, its lower extremity extending outside the said lower member, the said valve passage centrally located within the said lower member, and supported therein by supporting members, a valve seat attached between the said flanges of the said upper member and the said lower member the said valve seat being provided with oval shaped apertures, a valve proper having a downward protruding portion, cone shaped, and located in a relative central position with the said valve passage, the said valve proper and a ring being attached to a stem, the said valve proper being also provided with a threaded portion, an operating rod attached to the said stem by means of clamps having tongued portions to engage in grooves in the said operating rod and in the said stem, said clamps being secured to one another, the said operating rod being threadedly attached to the said upper member and having a hand wheel by which the said operating rod may be turned so as to raise or lower the said valve proper.

In testimony whereof I have affixed my signature.

JOHN SCHMIDT.